United States Patent [19]
Rohrberg

[11] Patent Number: 5,803,526
[45] Date of Patent: Sep. 8, 1998

[54] ERGONOMIC AUTOMOTIVE COMPARTMENT ACCESS SYSTEM

[76] Inventor: Roderick G. Rohrberg, 2742 W. 234th St., Torrance, Calif. 90505

[21] Appl. No.: 787,997

[22] Filed: Jan. 24, 1997

Related U.S. Application Data

[63] Continuation-in-part of Ser. No. 273,518, Jul. 11, 1994, abandoned.

[51] Int. Cl.[6] .................................................. B62D 25/10
[52] U.S. Cl. .............................. 296/76; 40/209; 16/110.5
[58] Field of Search ................ 296/76, 1.1; 40/200–203, 40/209; 16/114 R, 124, 110 R, 110.5

[56] References Cited

U.S. PATENT DOCUMENTS

| | | | |
|---|---|---|---|
| 2,770,515 | 11/1956 | La Barre | 312/209 |
| 3,009,214 | 11/1961 | Thompson | 16/110.5 |
| 3,363,931 | 1/1968 | Christie | 296/1 |
| 4,956,930 | 9/1990 | Troncoso | 40/209 |

*Primary Examiner*—Stephen Avila
*Attorney, Agent, or Firm*—Anglin & Giaccherini

[57] ABSTRACT

The present invention provides an elegant automotive accessory which includes a fortified, rigid projection (23) capable of bearing a substantial load such as an integral extended ledge, surface, lever or lip on one portion of a license plate frame (12) mounted on a vehicle such as a car, van or truck. This fortified, rigid projection or surface (23) provides a safe, convenient handle that is especially designed to enable the user to open and to close a trunk deck lid (DL) of an automobile (A). Although the preferred embodiment (10F) of the present invention utilizes an integral load-bearing projecting surface (23F) formed into a license plate frame (12), alternative embodiments may employ separate handles (28) or knobs (40). These separate rigid and firmly-coupled projections that are not integrally formed with a license plate frame may be directly coupled or affixed to other portions of the door which it will be used to open and close.

12 Claims, 15 Drawing Sheets

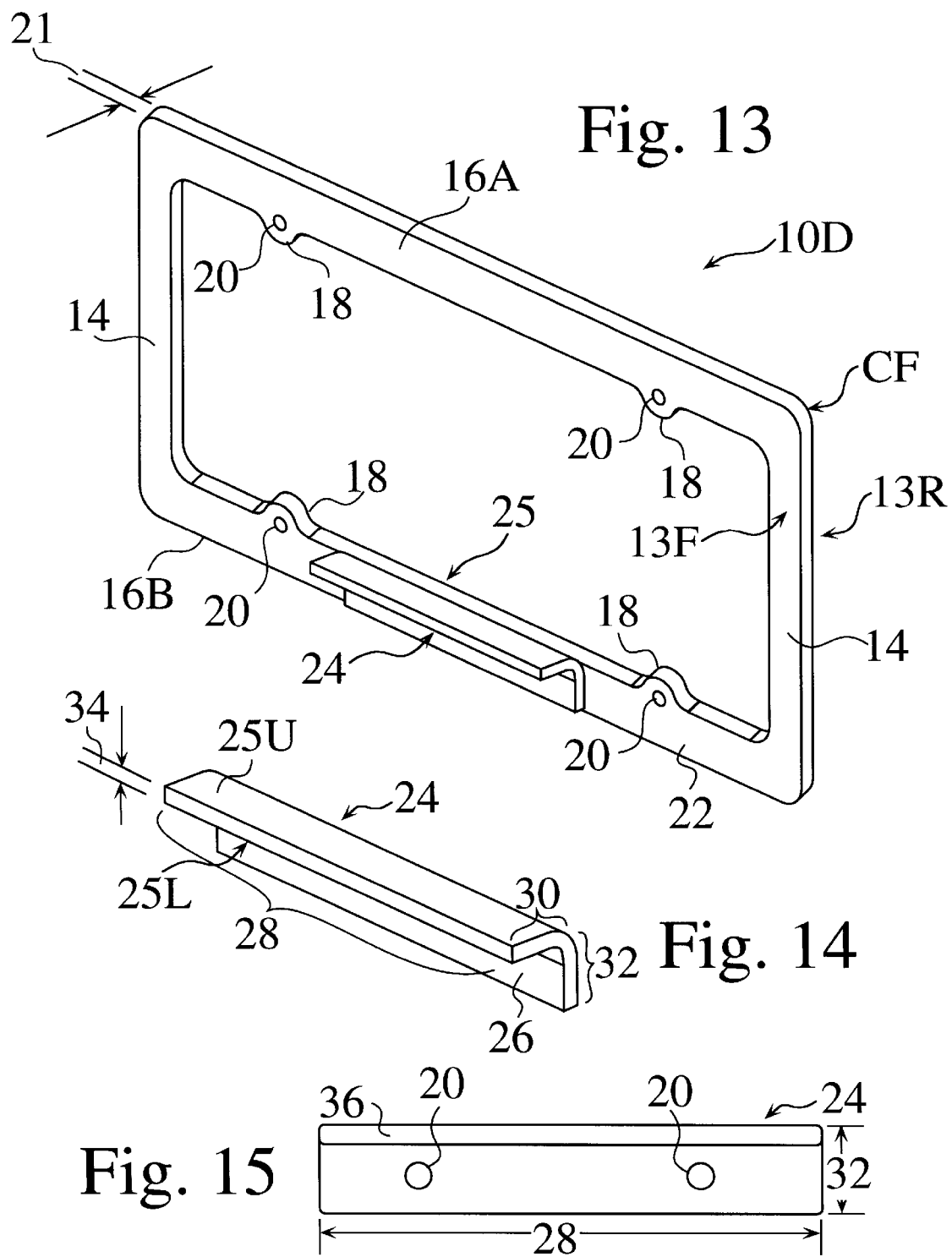

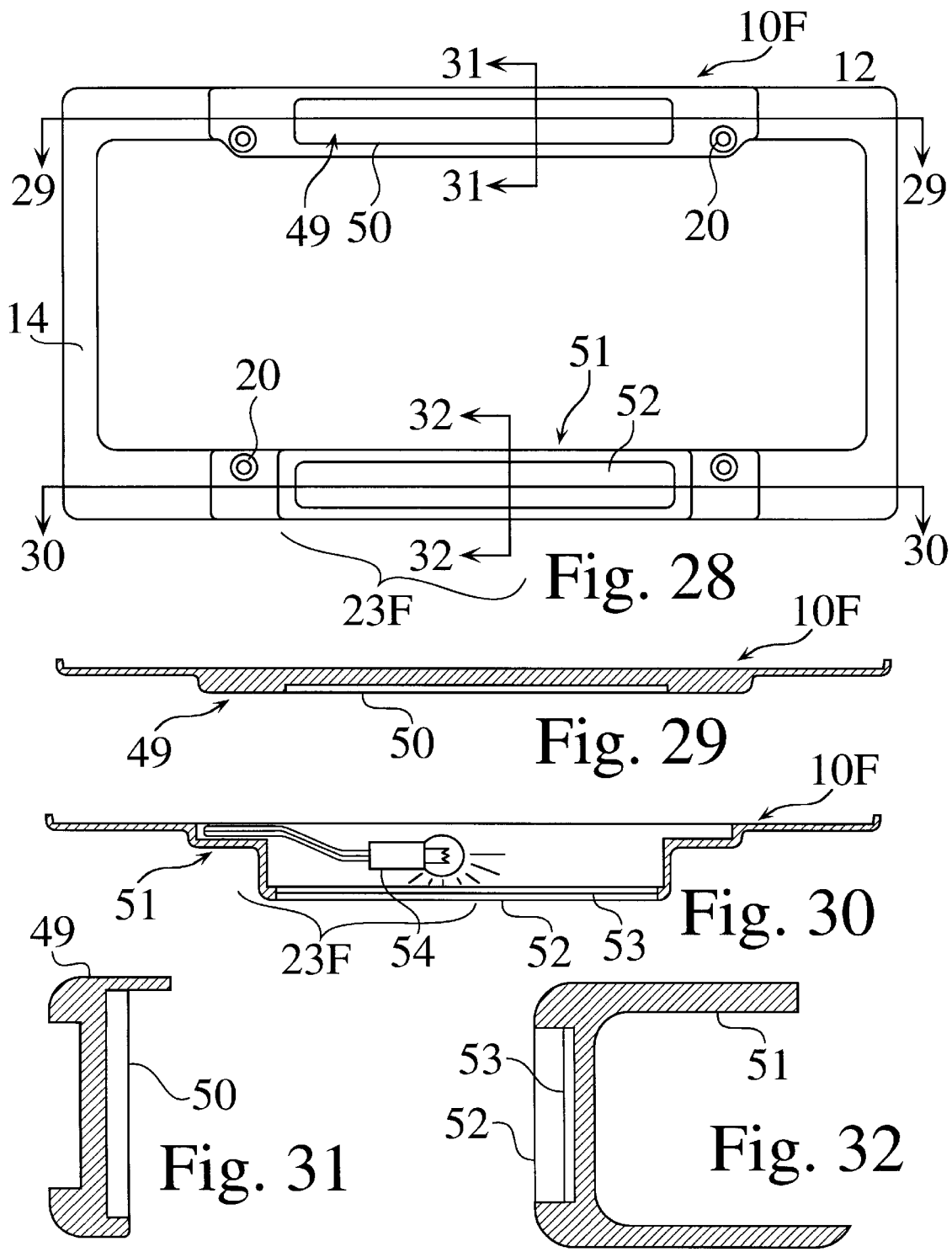

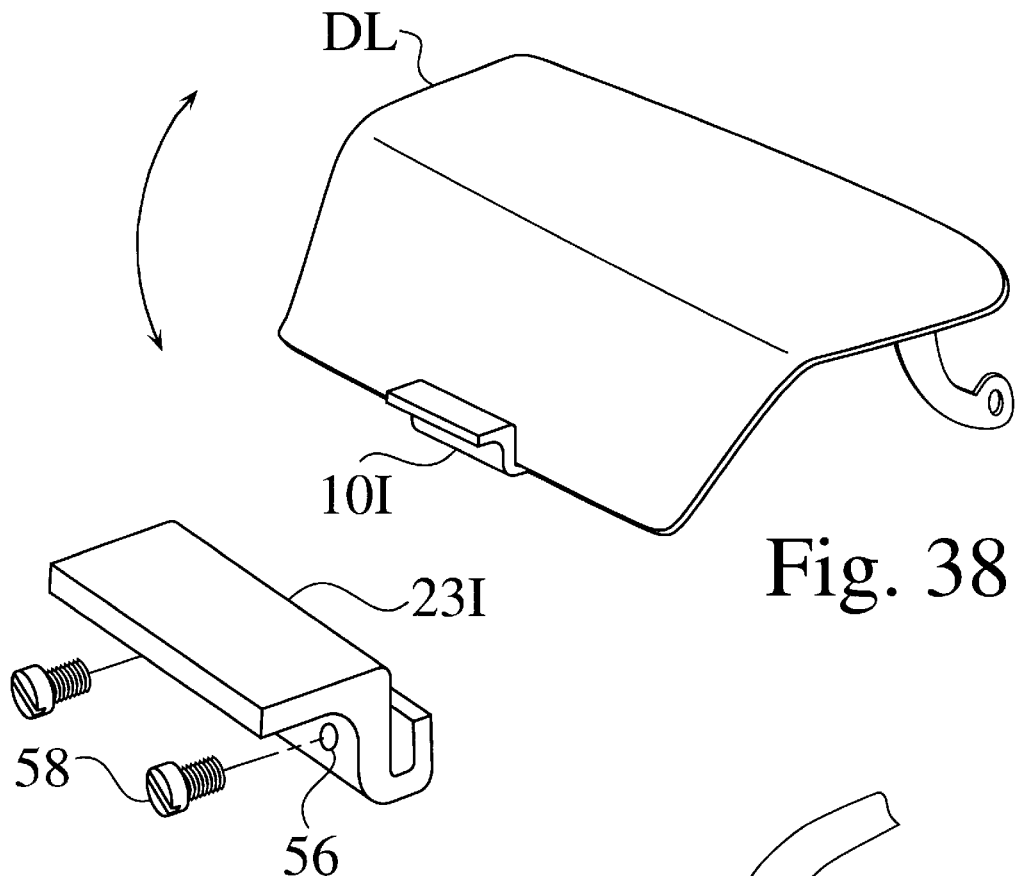
Fig. 38
Fig. 39
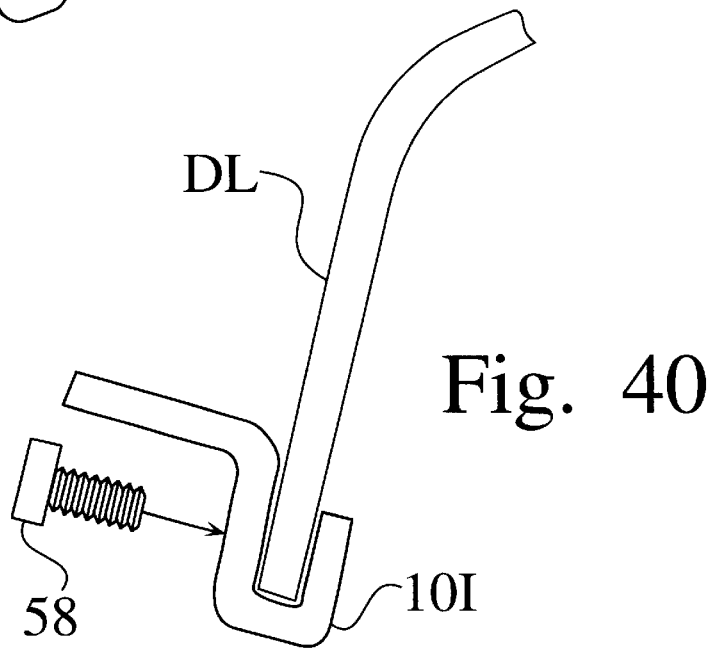
Fig. 40

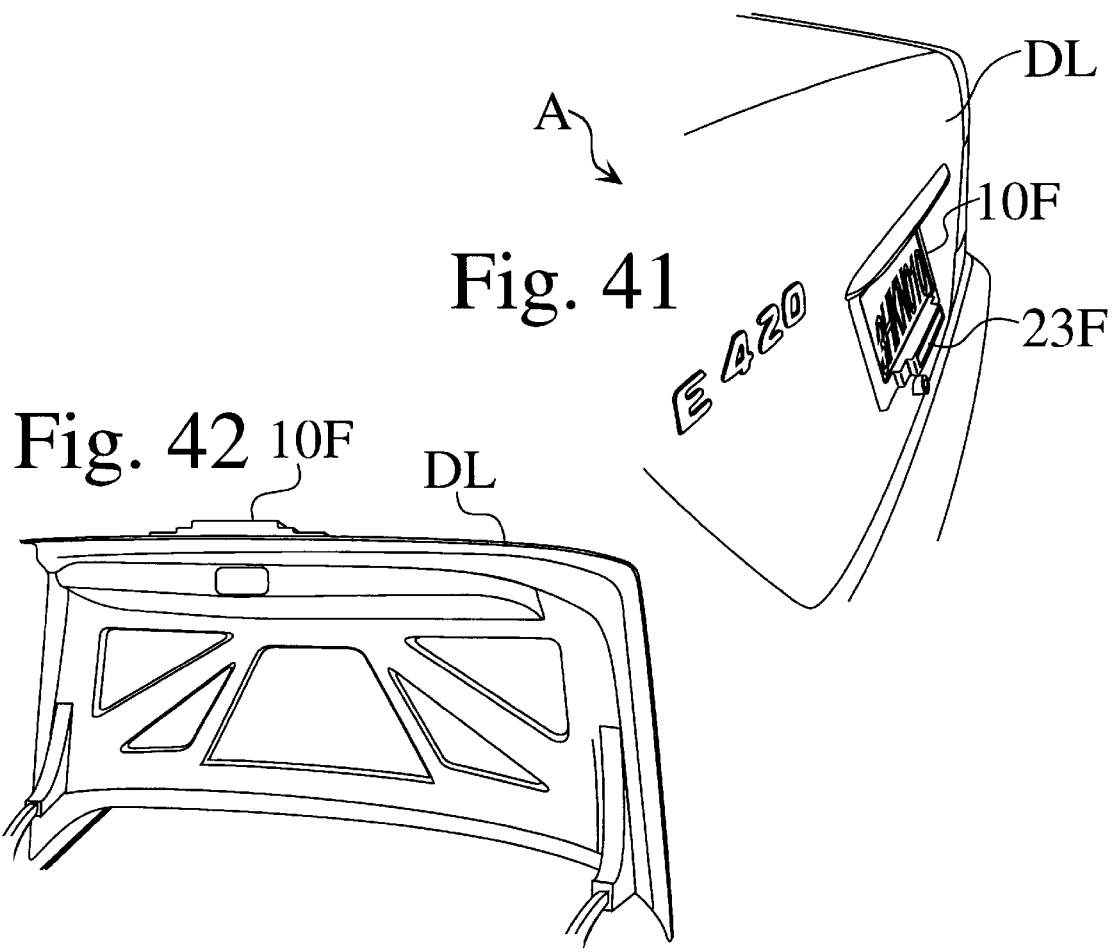
Fig. 41
Fig. 42
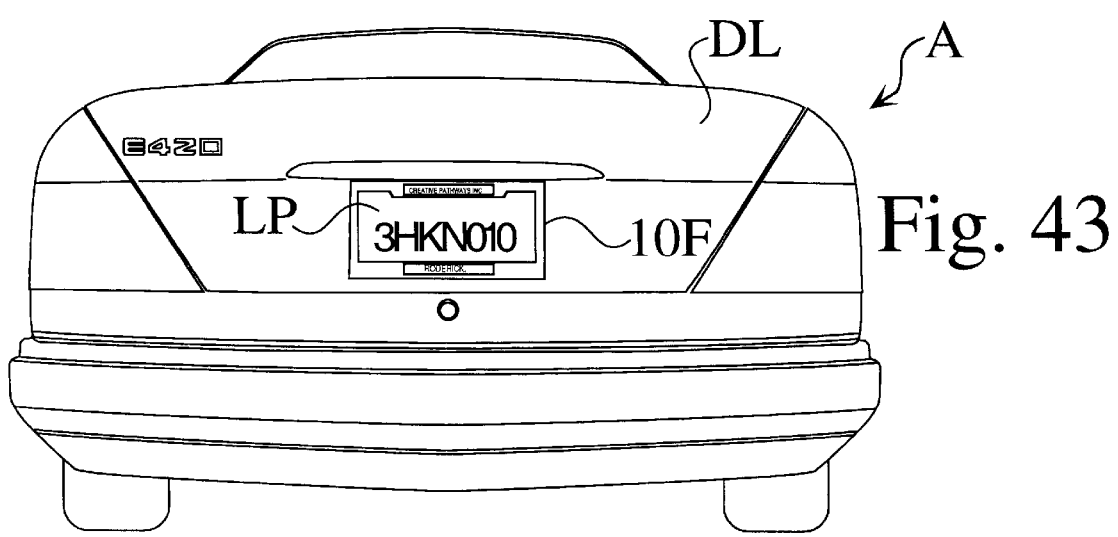
Fig. 43

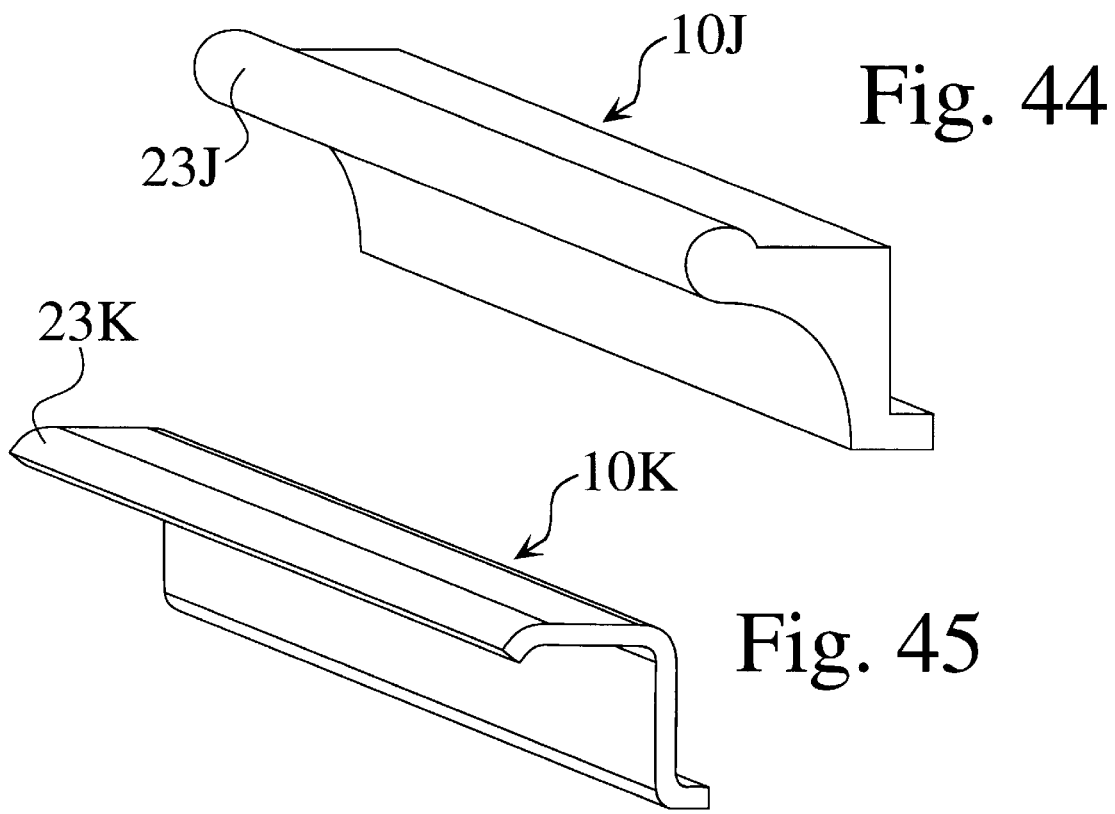
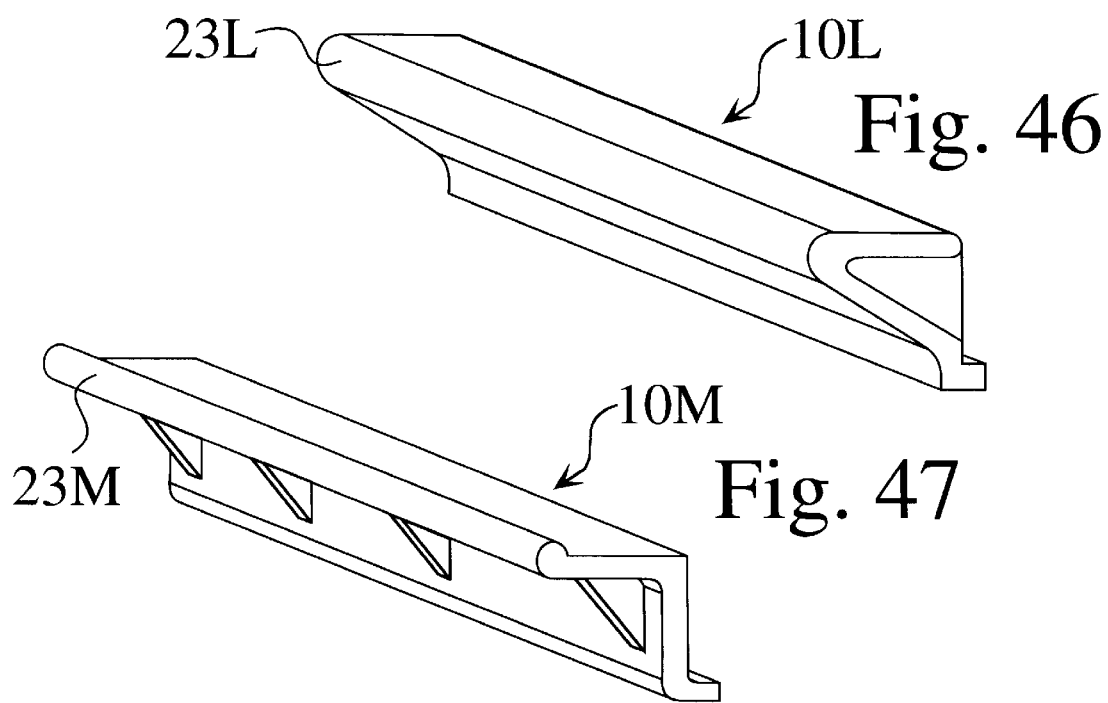

ERGONOMIC AUTOMOTIVE COMPARTMENT ACCESS SYSTEM

The Applicant hereby claims the benefit of priority for all subject matter disclosed in U.S. patent application Ser. No. 08/273,518 now abandoned. The present Application is a Continuation-in-Part Application and is related to the following commonly-owned Patent Application:

Ergonomic Automotive Compartment Access System by Roderick G. Rohrberg, filed on 11 Jul. 1994 and assigned U.S. patent application Ser. No. 08/273,518 now abandoned.

FIELD OF THE INVENTION

The present invention is an apparatus that may be used in combination with a hinged trunk deck lid of an automobile. More particularly, the Ergonomic Automotive Compartment Access System is a highly effective device that allows a person to easily open and close the trunk, hatchback or tailgate of an auto.

FEDERALLY SPONSORED RESEARCH OR DEVELOPMENT

Not Applicable.

BACKGROUND OF THE INVENTION

Many automobiles have rear doors or compartments such as trunks, hatchbacks and tailgates. These hinged panels all swing upward from the back of the vehicle and provide access to storage spaces or to passenger seating. The hinged structures typically include integral springs or air-filled struts that counter-balance their own weight.

Most trunks or hatchbacks are opened using either conventional keys or electronic keyless entry systems, and then by lifting the hinged panel upwards. The panel is usually lifted by hand using any available surface of the hinged panel. The surfaces or edges that are available to raise the trunk are often badly suited to the task. The edges of sheet metal that form the lower boundary of the trunk deck lid can be sharp or rough. The edges of a license plate or of the trunk itself may be rough enough to cut the user's hand or to cause a fingernail to break. Other surfaces, such as strips of plastic or metal trim, may not be strong enough to bear the stress of being used to repeatedly open and close a heavy trunk panel.

Most automobiles do not offer safe and convenient surfaces that can be used to both open and close the trunk. Using the deck lid as a surface for closing the trunk usually results in dirty hands. In the absence of purposefully designed surfaces that are intended to be used to open and to close a trunk or hatchback, the operator of a vehicle must make do using any available surface, resulting in streak marks and unsightly fingerprints on painted surfaces or broken fingernails.

A J. C. Whitney & Company Auto Parts Accessories Book depicts a license plate frame. Page 104 of Catalogue No. 457D presents the following text:

"License plate frame with ILLUMINATED Vehicle Name. No-corrode black polystyrene frame customized with vehicle name in bold. Illuminated red letters. Illumination turns on/off with vehicle's lights. Includes replaceable bulbs, wiring, hardware, quick-connect connectors, instructions, 12 volt."

In U.S. Pat. No. 4,956,930, Troncoso discloses a license plate cover. Troncoso's Abstract states:

"The license plate cover prevents viewing of the license plate identifying characters from the sides of the plate but does not prevent viewing thereof from directly in line with the plate. The cover includes a frame adapted to overlie the plate and defining a central opening through which the plate numbers can be seen. To the frame are connected a number of spaced vanes which project outwardly thereof and obscure side viewing of the plate numbers. For this purpose, it is preferred to have the vanes parallel with each other and running from the top to the bottom of the frame across the opening, and perpendicular to the main plane of the frame. The vanes can be opaque or transparent. In the latter case, the collective effect of side viewing through the array of vanes is to obscure such viewing. The vanes can be unitary and integral with the frame or pivotally connected thereto for moving between an open position and closed position, the latter overlying the plate identification indicia, to protect the plate under special circumstances. The cover can include a slide bar to move the vanes, retainers to hold the vanes in open and closed positions and one or more spring-biased clips or the like to releasably connect the cover over the license plate. The sides of the vanes can bear symbols and the like for decorative and other purposes."

Troncoso's Summary of the Invention states that:

"The present invention satisfies all the foregoing needs. The invention is directed to an improved vehicle license plate cover. The cover is substantially as set forth in the Abstract of the Disclosure.

Thus, the cover fits over the face of the vehicle license plate and is attached directly to the plate or to a bracket holding the plate. The cover includes a frame which directly overlies the outer periphery, margin or perimeter of the license plate and thus is of the same overall size and shape, and which defines with its top, bottom and sides a central opening through which the numbers and other indica of the plate can be viewed. An important second component of the cover comprises a plurality of flat vanes separately or integrally connected to the frame and spanning the central opening at spaced intervals. In a preferred embodiment, the vanes are parallel to each other and vertically bridge the central opening, including the sides thereof. The vanes project outwardly from the frame at an angle to the main plane of the frame. Preferably, the vanes are perpendicular thereto.

In another embodiment, the vanes are pivotally connected to the frame and therefore moveable between an open position perpendicular to the frame and a closed position parallel to the frame and wholly overlying the face of the license plate. A slide bar is connected to the vanes for moving them simultaneously between the open and closed positions, where they are releasably held by retainers on the frame. The vanes can be transparent or opaque. If transparent, there are a sufficient number of the vanes so that viewing of the license plate numbers from the side of the plate is nevertheless obscured by the cumulative obscuring effect of the vanes, since the vanes are provided with inclusions or surface irregularities or the like.

The vanes can also be provided with decorative, informative or amusing indicia or the like, which can be viewed from the side when the vanes are open or from the front or rear when the vanes are closed . . . ."

The J. C. Whitney device is intended to illuminate the license plate and to identify the type of vehicle on the frame. The Troncoso invention pertains to the placement of several parallel vanes over the license plate to prevent the viewing of the plate except from directly behind the car. Neither the J. C. Whitney nor the Troncoso references disclose, teach or suggest, either separately or in combination, a method or apparatus for opening or closing the hinged deck lid of an automobile.

In U.S. Pat. No. 2,241,647, Simon relates to the mounting on the rear door of the automobile, a hollow bracket or casting on which the license plate holder is secured.

In U.S. Pat. No. 5,211,436, Feder discloses a handle device for use in imparting a movement to an automobile door about a hinge axis for the purpose of opening and closing the door without causing the user's hand to become dirty.

In U.S. Pat. No. 3,363,931, Christie relates to a mounting member for use in conjunction with the luggage compartment handle of a two-door Volkswagen automobile.

In U.S. Pat. No. 2,575,211, Flacke discloses an arrangement of lock and license plate on a lid forming part of the outer wall of a motor vehicle.

In U.S. Pat. 2,684,265, Ceresa discloses an improved supporting means for supporting the hinged trunk deck of an automobile body in an open position to provide ventilation of the trunk compartment.

In U.S. Pat. No. 3,009,214, Thompson discloses a lifting tab for storm and screened sash in combination storm windows.

In U.S. Pat. No. 2,770,515, La Barre discloses a medicine cabinet having a novel and inventive sliding door construction and a sliding door releasable catch.

In U.S. Pat. No. 2,921,395, Fishman discloses a license plate holder which forms a protective covering for the license plate, is molded of plastic material in one piece and which supports a supporting member made of resilient material and against which is nested the license plate.

In U.S. Pat. No. 4,736,539, Dickinson discloses a bumper sticker holder.

In U.S. Pat. No. 4,170,838, Bott discloses a license plate frame assemble consisting of a one-piece frame member which may be fabricated of a molded plastic material, a die stamped metal or the like. The front wall of the license plate frame provides a decorative face which may be provided with a hot stamped complementary decorated surface.

In U.S. Pat. No. 4,011, 675, Herring discloses a removable license plate holder adapted for use where one plate is constantly being moved from one vehicle to another.

Mercedes Benz™ has recently provided an expensive and complex solution to this problem by incorporating a complicated mechanism into a trunk deck lid that operates as an automatic handle. When the trunk is unlocked, an electromechanical actuator causes a flat member to protrude through an opening in the rear of the deck lid. This member retracts automatically when the trunk is closed. This feature is only offered on Mercedes' expensive models.

Earl's Performance Products of Long Beach, Calif. distributes a machined aluminum License Plate Frame (Model Nos. 3535110 and 3535112) which sells at retail for about $70. This conventional license plate frame has sharp comers and edges. The rear license plate frame marketed by Earl's features a built-on light that can be placed at either the top or bottom position. This built-on light is attached to the frame using metal screws. While this optional light does unintentionally add a surface to the frame, it is not sufficiently rigid or strong enough to function as a surface which the operator of the vehicle can safely use to open or to close the trunk. This lower surface of the projection on this frame is a thin plastic strip which covers a light bulb compartment. If this surface were used to lift the trunk, the plastic strip might rupture. This would allow the user's fingertips to press upward inside the light bulb compartment, perhaps resulting in a bum or a cut on the fingertips.

No conventional automobiles presently provide an effective yet low cost solution that offers a convenient and safe means for both opening and closing a trunk deck lid. The development of an inexpensive and reliable device for opening and closing the rear hinged panel of cars, vans and trucks would satisfy a long felt need within the automotive industry.

SUMMARY OF THE INVENTION

The Ergonomic Automotive Compartment Access System disclosed and claimed below furnishes an elegantly simple automotive accessory that fills a void in the current marketplace. The present invention, which will be marketed using the trademark "Handy-Tab, " supplies an economical and inconspicuous solution that may be easily installed or retrofitted by an automobile dealer, an auto service center or by a vehicle owner. Unlike other prior license plate frames, the invention is specifically and particularly designed to assist in the opening and closing of a hinged deck lid.

The Ergonomic Automotive Compartment Access System comprises a rigid and strong projection such as an integral extended ledge, surface, lever or lip on one portion of a license plate frame mounted on a vehicle such as a car, van or truck. This projection or surface must be deliberately engineered to bear the load of acting as a lever which is operated by the person who opens and closes the trunk. The Handy-Tab™ provides a convenient, smooth and easy-to-use handle that enables the user to open and to close a hinged panel which offers access to an enclosed storage or passenger area. The invention is intentionally designed to include a wide and deep surface or ledge which can comfortably accommodate the user's fingertips. The invention is especially useful when the user has long fingernails. Although one of the preferred embodiments of the present invention utilizes an integral load-bearing surface or ledge formed into a license plate frame, alternative embodiments may employ separate brackets or handles. These separate projections that are not integrally formed with a license plate frame may be directly coupled or affixed to other portions of the door which it will be used to open and close.

The invention encompasses a number of preferred and alternative embodiments that utilize a wide variety of integrally formed and separate rigid surfaces and projections. Some of these alternatives include a solid two-armed bracket, protruding tabs, ledges, lips and surfaces integrated on a license plate frame and an assortment of extensions such as handles, knobs and loops.

An appreciation of other aims and objectives of the present invention and a more complete and comprehensive understanding of this invention may be achieved by studying the following description of preferred and alternative embodiments and by referring to the accompanying drawings.

BRIEF DESCRIPTION OF THE DRAWINGS

FIG. 13 is a perspective view of an alternative embodiment of the present invention. A double-armed bracket is incorporated into the lower portion of a license plate frame that is rigidly mounted on the trunk deck lid of an automobile. FIGS. 14 and 15 furnish perspective and front views of the double-armed bracket.

Figure 26:
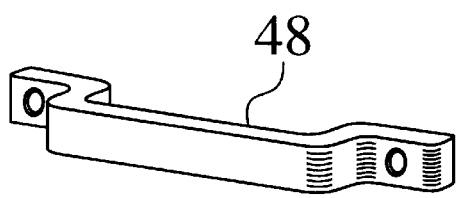
Figure 27:
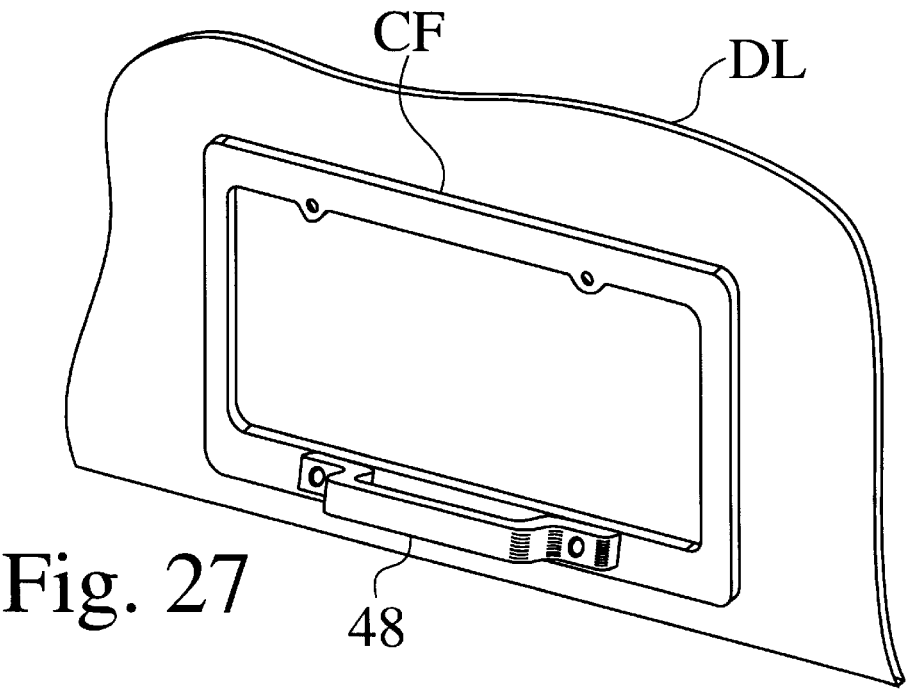

Similarly, FIG. 26 exhibits a bracket which may be combined with a license plate frame as shown in FIG. 27.

FIG. 28 reveals a front view of the preferred embodiment of the present invention which includes a plastic insert that carries a message. FIGS. 29, 30, 31, and 32 are cross-sectional views based on FIG. 28 which show the details of a plastic insert and how the insert may be illuminated at night.

Figure 33:
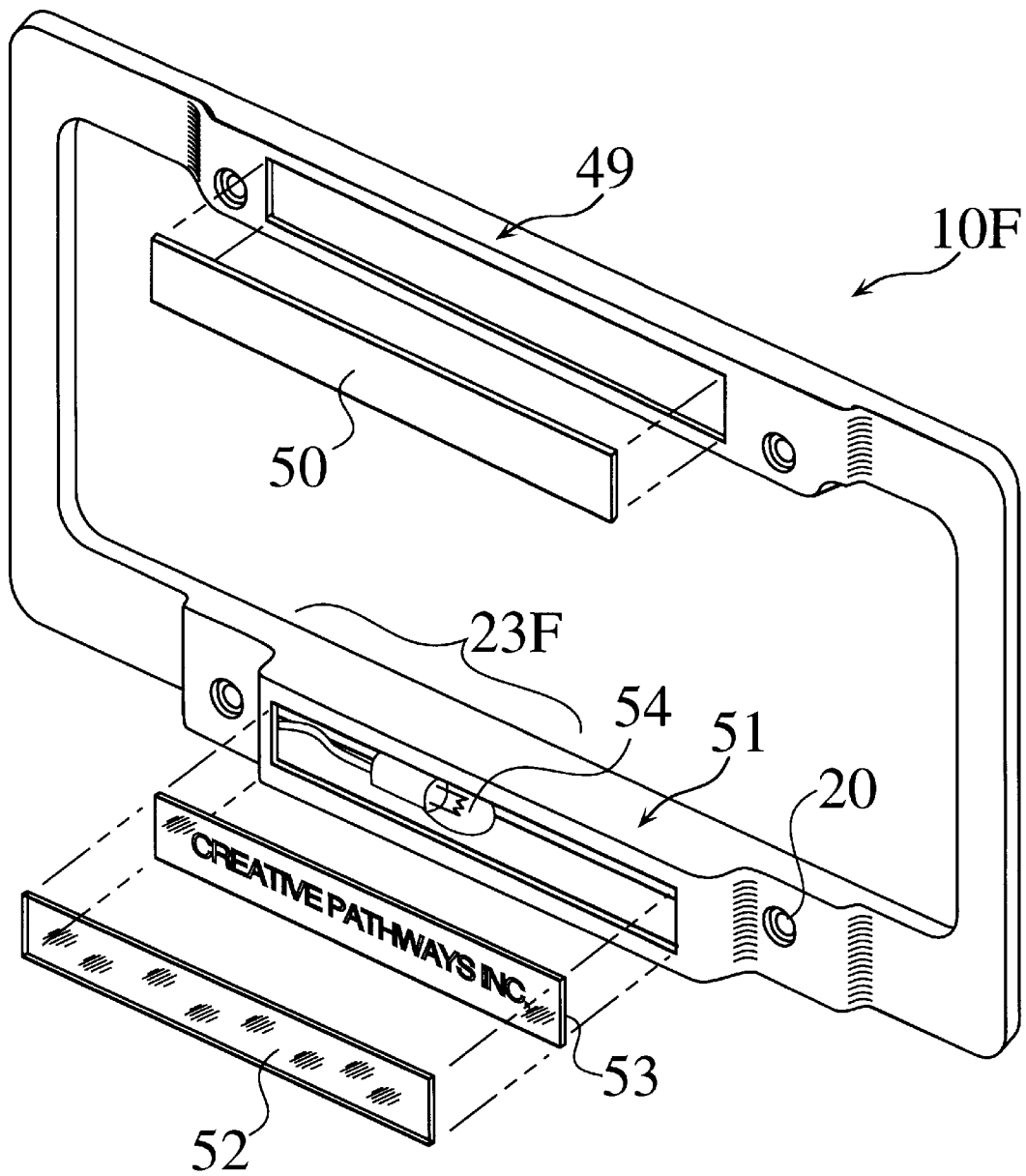

FIG. 33 is a perspective illustration of the preferred embodiment showing two inserts in a partial exploded view.

Figure 34:
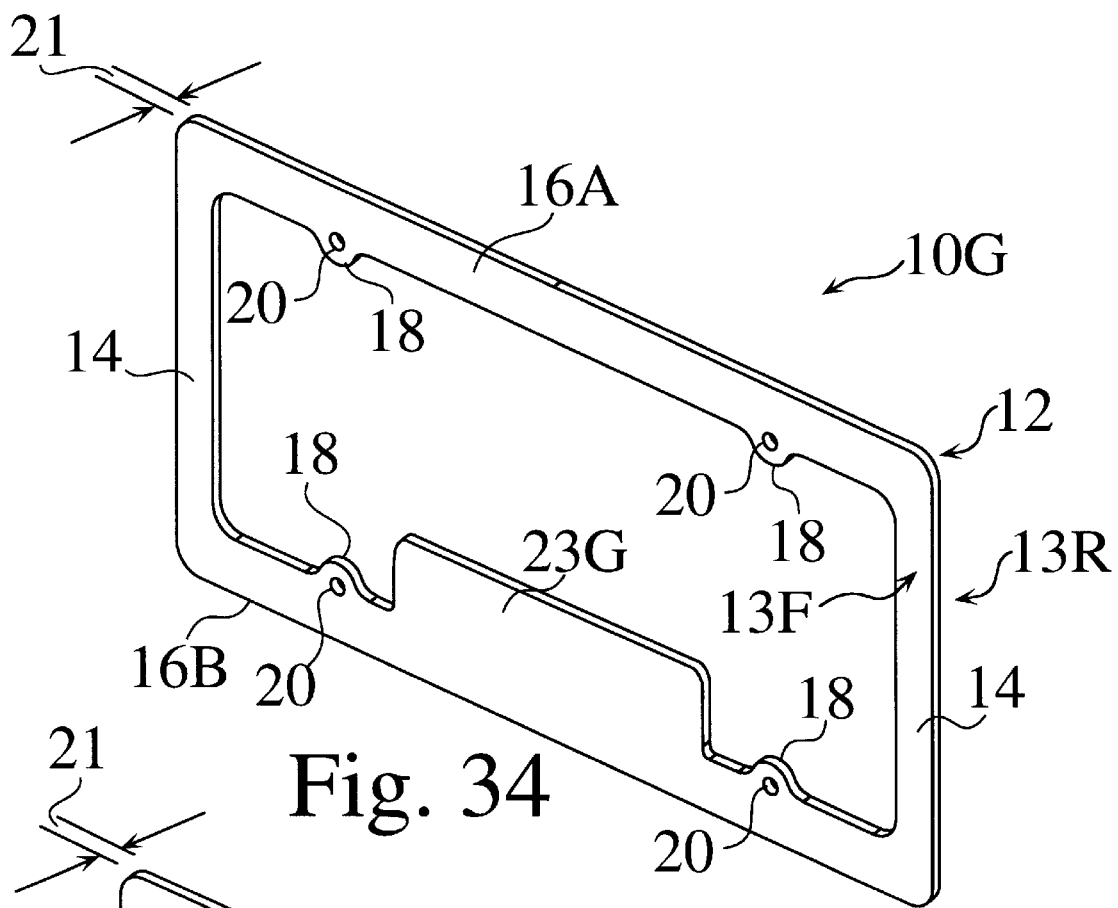
Figure 35:
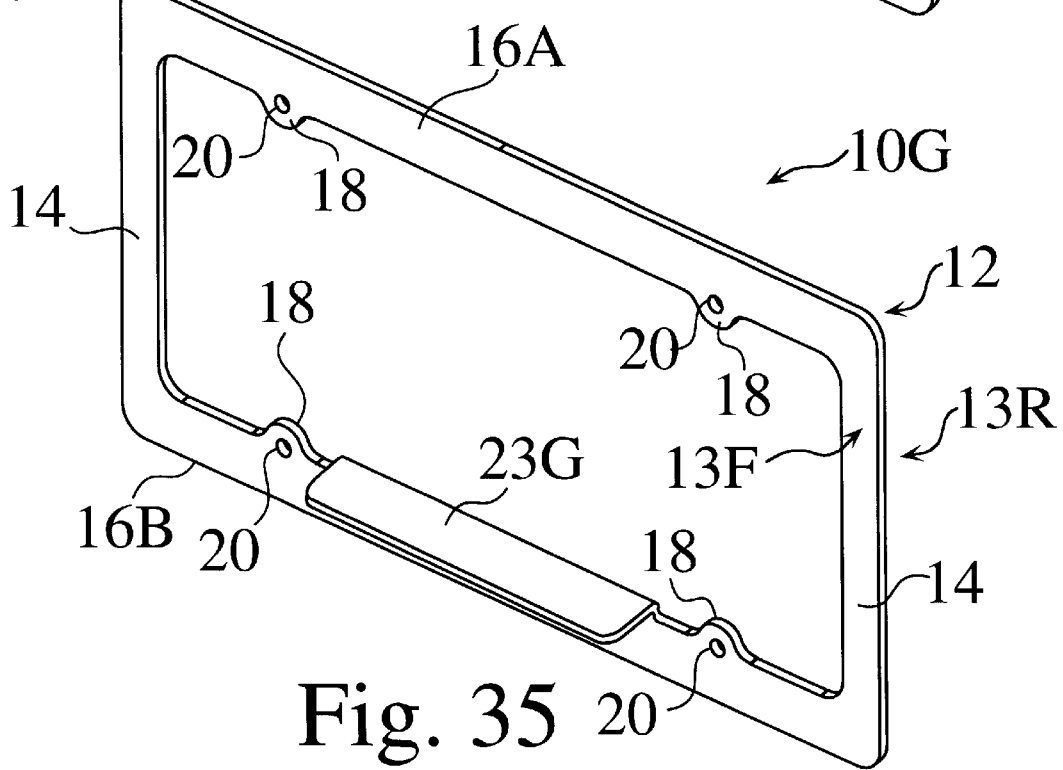

FIGS. 34 and 35 reveal another alternative embodiment which employs an integrally formed, bent tab that forms the projection which is used as a surface to open or to close the trunk.

Figure 36:
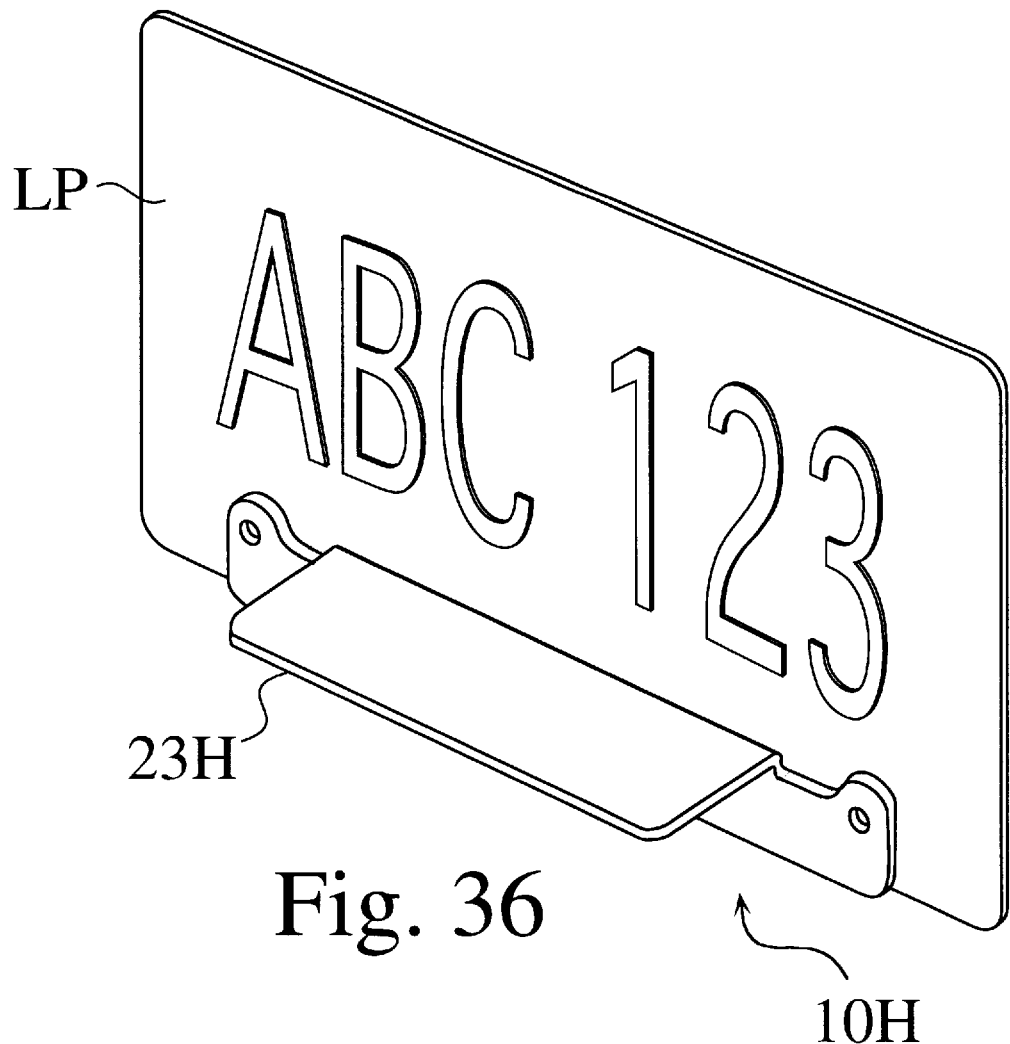
Figure 37:
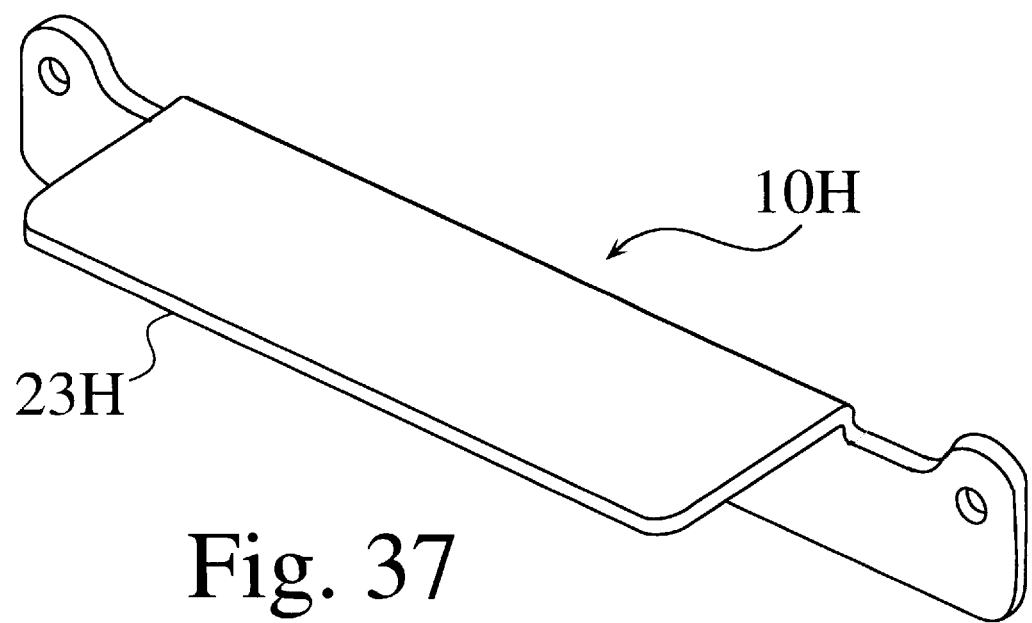

FIGS. 36 and 37 depict yet another alternative embodiment of the invention which may be attached to a conventional license plate frame.

FIGS. 38, 39 and 40 are illustrations of an embodiment which may be connected to a trunk deck lid using two drilled holes and screws.

FIGS. 41, 42 and 43 show the preferred embodiment of the invention in various views.

FIGS. 44, 45, 46 and 47 exhibit four additional alternative embodiments of the present invention.

DETAILED DESCRIPTION OF PREFERRED & ALTERNATIVE EMBODIMENTS

The Ergonomic Automotive Compartment Access System comprises a rigid and fortified projection, surface, ledge or lever which is attached to the trunk deck lid of an automobile. This projection provides both upper and lower surfaces which may be used to lift and to close the trunk comfortably using the fingertips without marking the paint finish of the vehicle. The invention, which will be marketed using the trademark "Handy-Tab," encompasses a number of different preferred and alternative embodiments, including a protruding tab integrated on a license plate frame, a double-armed bracket combined with a conventional license plate frame and an assortment of handgrips, handles, knobs and loops. In this specification and in the claims that follow, the term "operate the deck lid" is intended to encompass both the opening and closing of the deck lid. The term "automobile" is intended to refer to all forms of motorized vehicles that have doors to passenger or storage compartments, including vans and trucks. The term "deck lid" is meant to embrace any hinged door or panel on a motorized vehicle.

Unlike other commercially available products which may combine various incidental projections such as lighting attachments with a conventional license plate frame, the preferred embodiment of the present invention specifically and intentionally incorporates two fortified, rigid, inflexible and smooth levers or surfaces which are designed to receive the pressure of the user's fingertips to open or to close the trunk of an automobile. The projection provided by the present invention must be strong enough to endure repetitive use over the lifetime of the automobile. This projection or lever must also furnish a smooth, comfortable, convenient surface which is safe to operate. The projection must be designed and engineered from a tough inflexible material. In the preferred embodiment, the projection or lever must also be integrally formed with the license plate frame, meaning that the rigid projection and the frame must comprise a single, continuous, homogeneous and solid manufactured piece. Separate projections which are attached to conventional frames must be fortified by ridges or supports.

Unlike other currently available products, the present invention is specially and purposefully designed to operate a hinged deck lid. In contrast to the publications cited in the Background Section, and especially the J. C. Whitney and Troncoso documents, the Handy-Tab includes a rigid and fortified projection which is intended to be used many times to open and close the trunk or hinged compartment door of a vehicle.

In one of the preferred embodiments of the invention, the rigid projection includes a surface or ledge which extends approximately one quarter of an inch or more away from the license plate frame. One of the preferred embodiments utilizes a fortified projection that extends at least one inch away from a license plate frame. The present invention may be manufactured using a wide variety of well-known techniques, including injection-molded plastic, stamped or formed sheet metal, or machined aluminum, diecast alloys, stainless steel or various plastic materials. Preferred embodiments of the invention comprise a strong integrally formed ledge which extends away from a license plate frame. Alternative embodiments of the invention utilize a projection or bracket which may be rigidly and inflexibly coupled or fastened to a conventional license plate frame or to a trunk deck lid.

Figure 1:
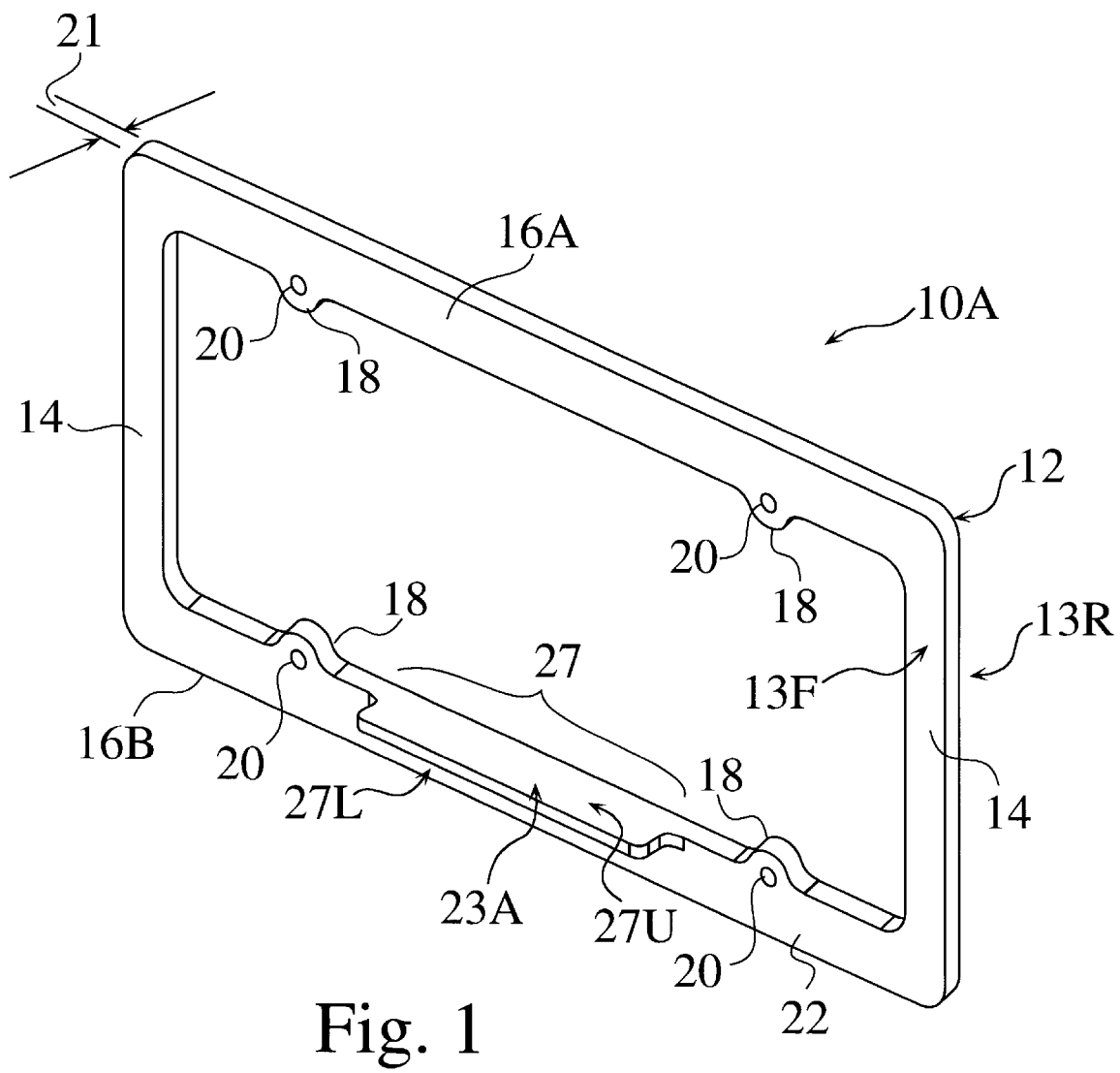
FIG. 1 portrays one embodiment of the invention which employs an integrally formed, rigid ledge which extends perpendicular to the face of the license plate frame. The present invention is referred to below as the "Handy-Tab™".

FIG. 1 reveals a perspective view of one of the preferred embodiments of the invention 10A. A license plate frame 12 includes front and rear faces 13F and 13R, side bars 14 and upper and lower cross bars 16A and 16B. Both upper and lower cross bars 16A and 16B have attachment hole tabs or bosses 18 which surround attachment holes 20. These holes 20 are designed to receive metal or plastic screws (shown in FIG. 21) which firmly fasten the license plate frame 12 to the trunk deck lid (shown in FIGS. 16 et seq.). The thickness dimension of the frame 12 is indicated by reference character 21. The lower portion 22 of the frame 12 which is situated on lower cross bar 16B supports a rigid projection 23A which extends away from the frame 12 in a direction which is generally perpendicular to the frame 12. The projection includes both an upper surface 27U and a lower surface 27L which are each purposefully designed to receive the fingertips FT of the operator of the vehicle. In the specification and in the claims which follow, the reference characters "10" and "23" are used generically to indicate various embodiments of the invention, while the reference characters 10A, 10B, 10C, 10D, 10E, 10F, 10G, 10H, 10I, 10J, 10K, 10L and 10M are employed to refer to different specific embodiments. Similarly, reference characters 23A, 23B, 23C, 23D, 23E, 23F, 23G, 23H, 23I, 23J, 23K, 23L and 23M are employed to refer to different specific embodiments of the generic projection 23.

Figure 2A:
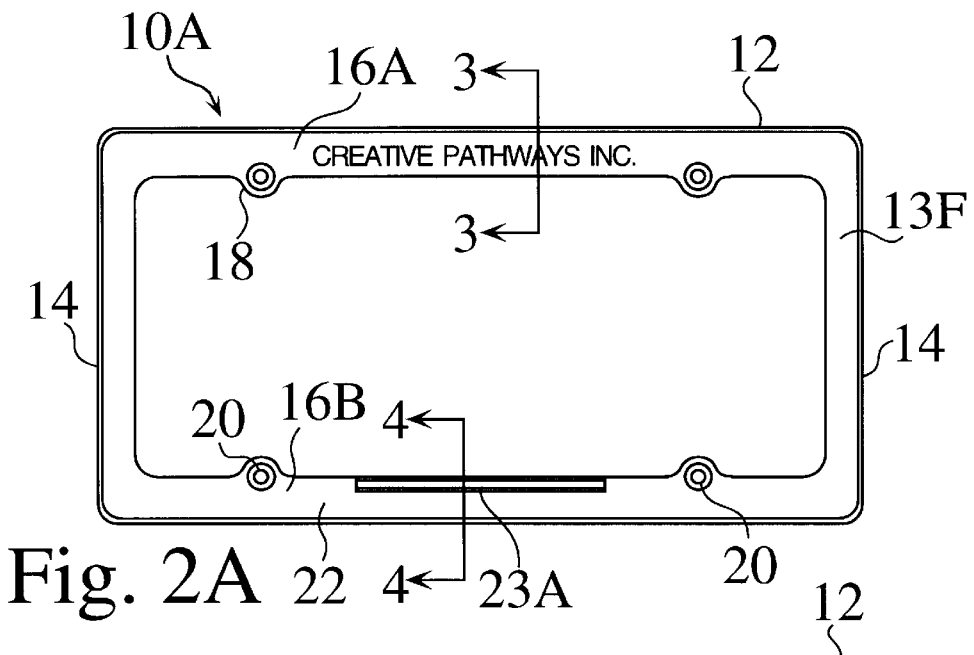
FIG. 2A and 2B are front views of a license plate frame with a perpendicular ledge.
Figure 2B:
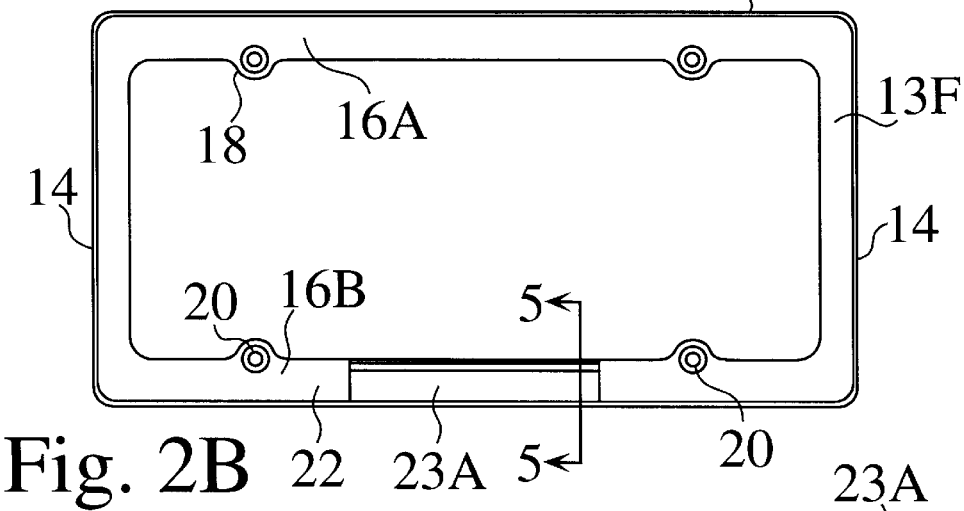
Figure 3:
FIGS. 3, 4 and 5 provide sectional views of the license plate frame shown in FIG. 2.
Figure 4:
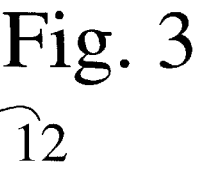
Figure 5:
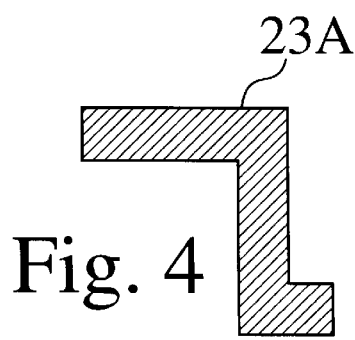

FIGS. 2A and 2B present a front view of the embodiment 10A shown in FIG. 1. Section lines 3—3, 4—4 and 5—5 identify one cross-sectional view of the frame 12 in FIG. 3 and two cross-sectional views of two different versions of projections 23A shown in FIGS. 4 and 5.

Figure 6:
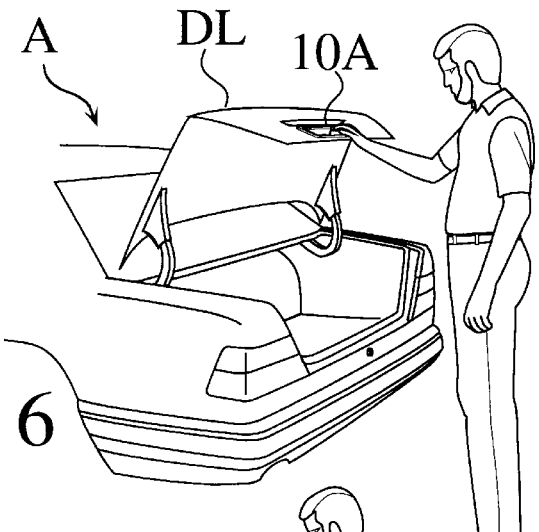
FIGS. 6, 7A, 7B and 8 depict the operation of the present invention.
Figure 7A:
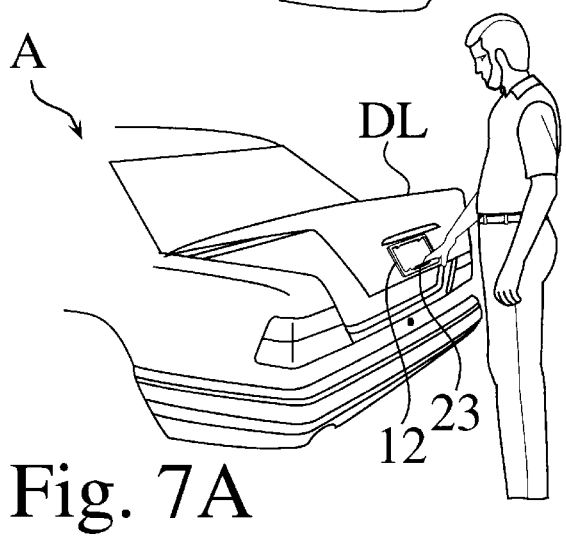
Figure 7B:
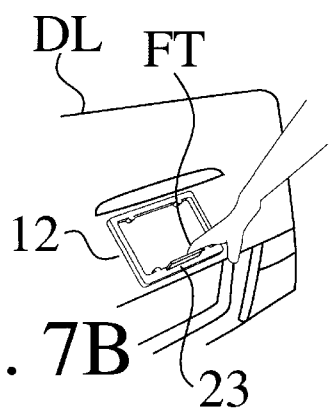
Figure 8:
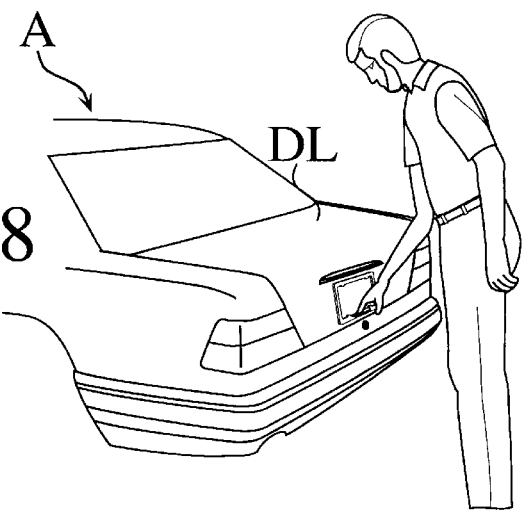

FIGS. 6, 7 and 8 provide a sequence of illustrations that show how the present invention is employed to open and to close a trunk deck lid DL of an automobile A. Without the Handy-Tab™, many persons who are not tall enough to reach over the top of the trunk deck lid encounter difficulty closing the trunk. As shown in FIG. 6, the Handy-Tab™ offers a convenient solution by providing a surface which is closer to the person opening and closing the trunk.

Figure 9:
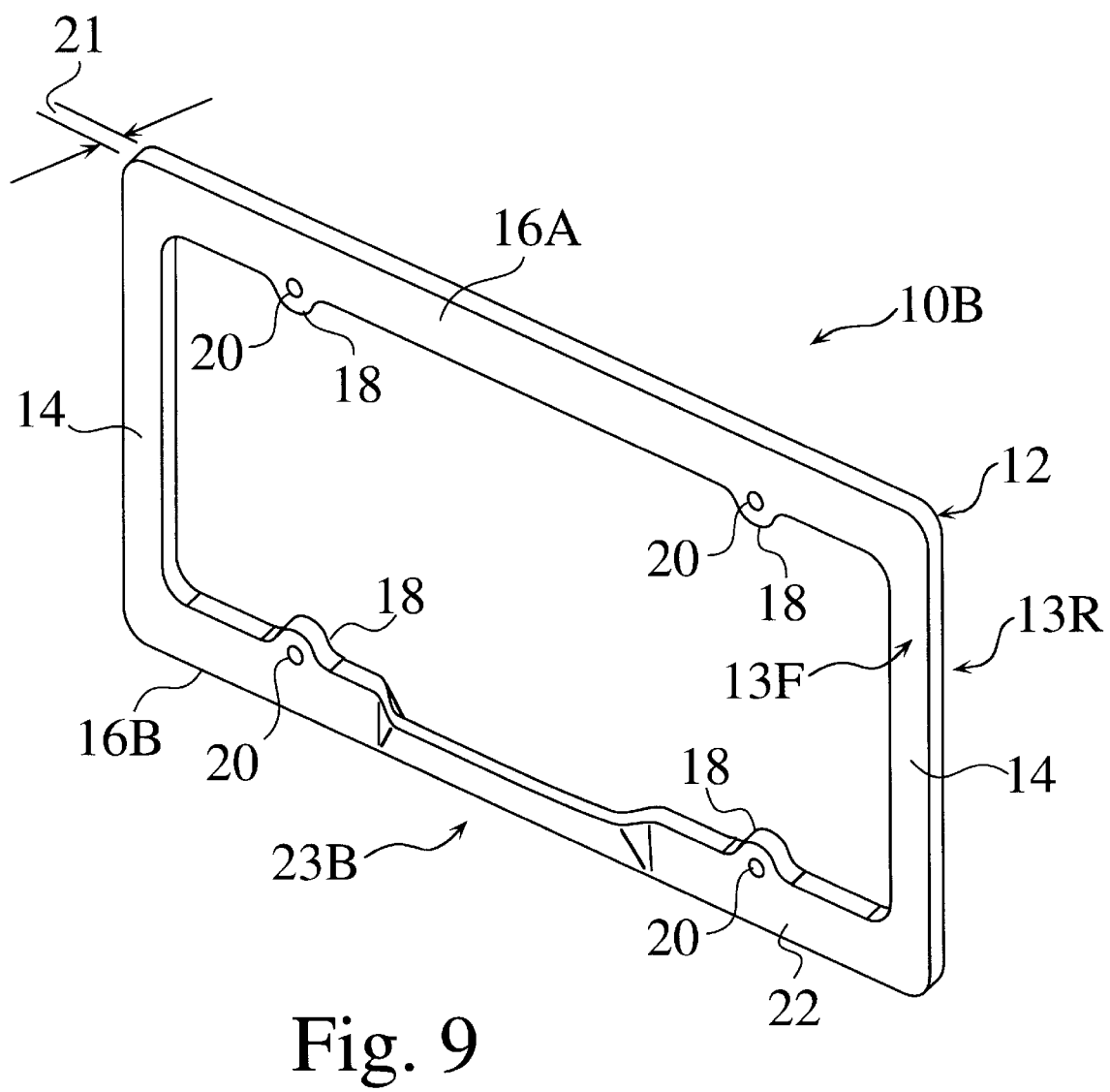
FIG. 9 furnishes a view of an alternative embodiment that incorporates an integrally formed, rigid angled edge or lip as part of the license plate frame.
Figure 10:
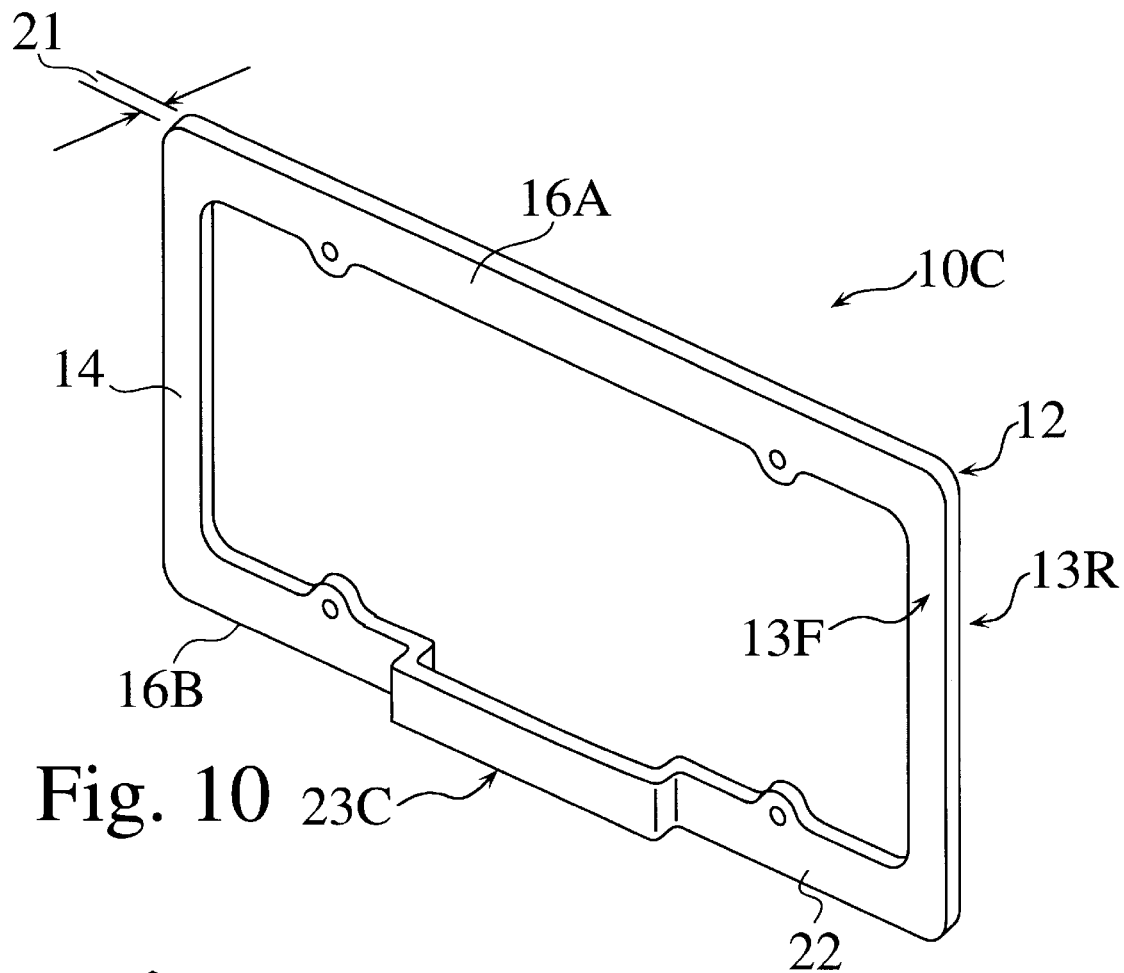
FIG. 10 supplies a view of another alternative embodiment that provides a strong offset protruding bar.
Figure 11:
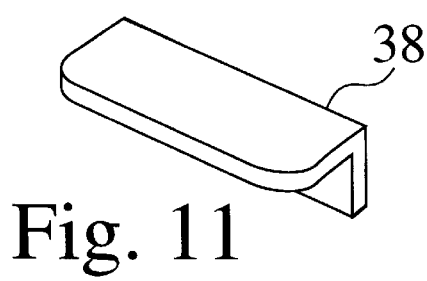
FIGS. 11 and 12 illustrate handle brackets that may be attached to the protruding bar shown in FIG. 10.
Figure 12:
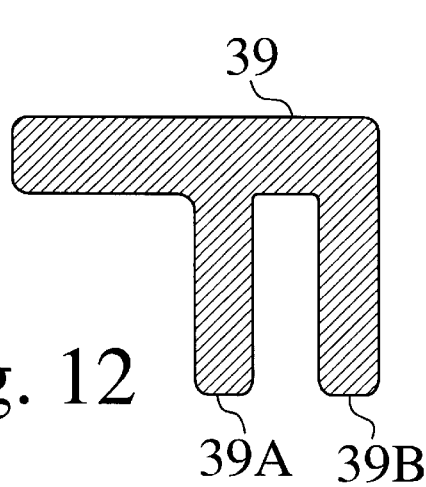

FIGS. 9 and 10 are each perspective views of alternative embodiments 10B and 10C. FIG. 9 shows an angled lip or inclined surface 23B that has been rigidly and integrally formed on license plate frame 12, while FIG. 10 shows an offset portion 23C of frame 12 which is generally parallel to but which is not coplanar with the face 13F of the frame 12. FIGS. 11 and 12 illustrate brackets 38 and 39 which may be used in combination with the embodiment 10C shown in FIG. 10. Both brackets 38 and 39 may be attached to parallel portion 23C using screws or an adhesive (both shown in FIGS. 21 and 22). Bracket 39 has two sections 39A and 39B which fit over parallel 23C to provide a fortified physical coupling.

FIG. 13 exhibits another alternative embodiment 10D which employs a separate double-armed bracket 24 that is rigidly attached to a conventional frame CF. The lower portion 22 of the conventional frame CF which is situated on lower cross bar 16B is capable of receiving the two-armed bracket 24, which may be attached using screws or an adhesive (both shown in FIGS. 21 and 22). This alternative embodiment 10D offers a convenient means for retro-fitting older, unimproved conventional license plate frames CF. FIG. 14 portrays a perspective view of the bracket 24, which comprises an upper arm 25 and a lower arm 26. The upper arm 25 includes upper and lower surfaces 25U and 25L. The width of the entire bracket 24 is indicated by reference character 28, while reference characters 30 and 32 point out the depth and height of the bracket 24, respectively. The thickness of the bracket 24 is shown by reference character 34. FIG. 15 depicts a front view of the bracket 24, revealing the front face 36 of the upper arm 25.

Figure 16:
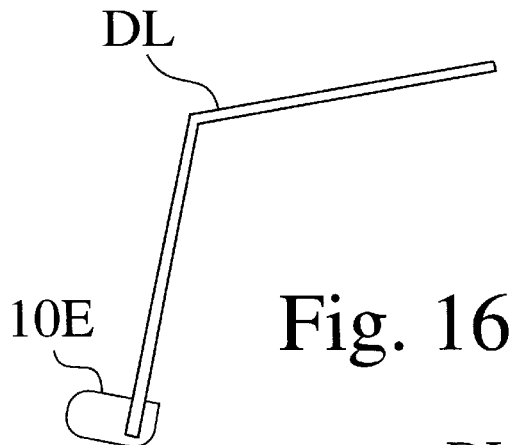
FIGS. 16, 17, 18, 19, 20, 21 and 22 illustrate various attachment schemes for several embodiments of the Handy-Tab™ license plate frame.
Figure 17:
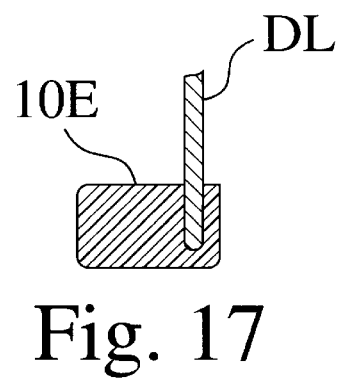
Figure 18:
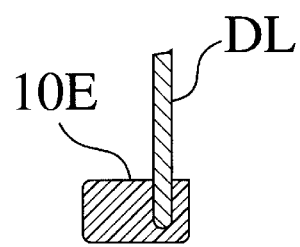
Figure 19:
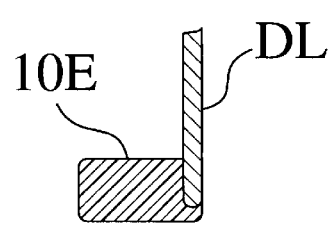

FIG. 16 present a schematic view of a deck lid DL and an alternative embodiment 10E of the Handy-Tab™. FIGS. 17, 18 and 19 reveal three cross-sections of different variations of the embodiment shown in FIG. 16.

Figure 20:
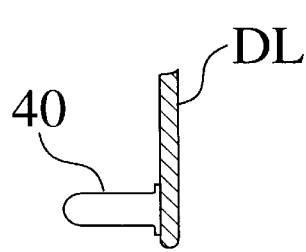
Figure 21:
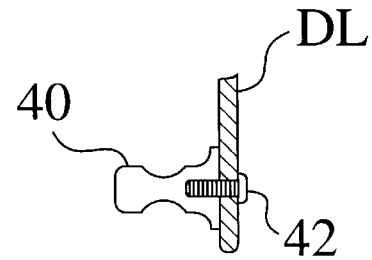
Figure 22:
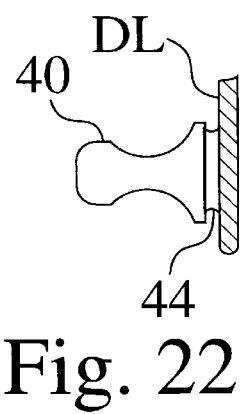
Figure 23:
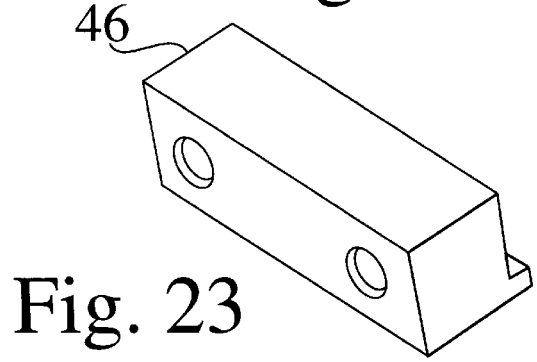
FIG. 23 is a perspective view of a drill jig that may be used to form holes in a license plate frame or deck lid for mounting the Handy-Tab™.

FIGS. 20, 21 and 22 reveal cross-sectional views of various embodiments of the Handy-Tab™ knobs 40 and their connections to the deck lid DL using screws 42 or an adhesive 44. FIG. 23 depicts a drill jig 46 that fits over deck lid 46 and that may be employed to make holes for the screws 42 shown in FIG. 21.

Figure 24:
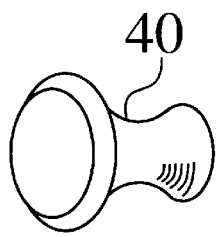
FIG. 24 depicts a knob that may be incorporated into an alternative embodiment of the invention as shown in FIG. 25.
Figure 25:
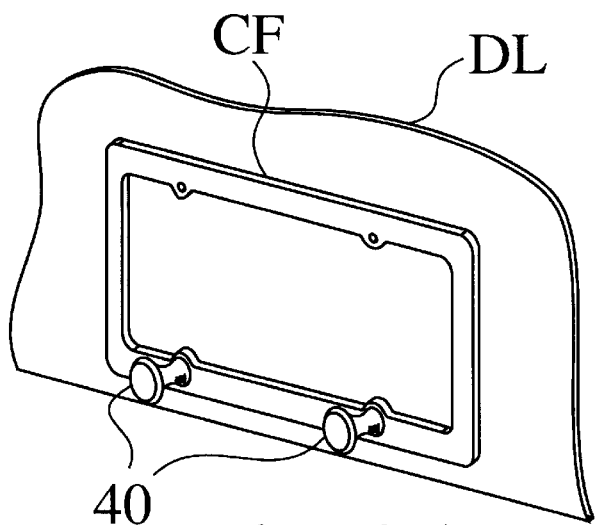

FIG. 24 illustrates a knob 40 that may be combined with a conventional license plate frame CF. The combination is shown in FIG. 25. Similarly, FIG. 26 illustrates a "U-shaped" bracket 48 that may be combined with a conventional frame CF as shown in FIG. 27.

FIG. 28 is a front view and FIGS. 29, 30, 31 and 32 are cross-sectional views of the preferred embodiment of the present invention 10F which includes an illumination compartment 51 that may carry a message, picture or decoration. The frame 12 includes an upper insert portion 49 that includes a clear plastic window 50. A message strip 53 may be placed behind the clear or translucent plastic window 50. Similarly, the frame 12 also includes an illumination compartment 51 that includes a clear or translucent plastic window 52. The illumination compartment 51 forms a rigid, load-bearing projection 23F, and may also comprise a light device 54 such as a bulb which illuminates the message strip 53 at night. FIG. 33 reveals the preferred embodiment 10F in a partially exploded view.

FIGS. 34 and 35 portray another embodiment of the invention 10G. This embodiment utilizes a bent tab which forms the projection 23G.

FIGS. 36 and 37 depict a similar configuration 10H which incorporates the a bent tab into a separate bracket 23H that may be attached directly to a license plate.

FIGS. 38, 39 and 40 illustrate yet another alternative embodiment 10I. This separate handle 231 fits around the bottom edge of a trunk deck lid DL. Two holes 56 receive two screws 58 that hold the handle 231 on the deck lid DL. The holes 56 may be used as a drill jig to form corresponding holes in the deck lid DL.

Several views of the preferred embodiment 10F affixed to an automobile A are presented by FIGS. 41, 42 and 43. FIG. 41 shows a perspective view of the preferred embodiment 10F when the trunk is closed, while FIG. 42 shows the lower portion of the preferred embodiment 10F when the trunk of the auto is in its opened position. FIG. 43 supplies a front view of the preferred embodiment.

Four different additional alternative embodiments 10J, 10K, 10L and 10M of the invention are illustrated in FIGS. 44, 45, 46 and 47. These alternatives include fortified projections 23J, 23K, 23L and 23M that may be separately attached to a conventional license plate frame CF, or may be integrally formed into a novel Handy-Tab™ frame.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the claims that follow.

LIST OF REFERENCE CHARACTERS

10 Ergonomic Automotive Compartment Access System Preferred & Alternative Embodiments:
10A Perpendicular ledge integrated with frame
10B Inclined surface integrated with frame
10C Parallel portion of frame
10D Combined double-armed bracket and conventional license plate frame
10E Deck lid edge handle
10F Preferred embodiment
10G Integrally formed bent tab
10H Separate bracket with bent tab
10I Screw-mounted deck lid edge handle
10J Alternative embodiment
10K Alternative embodiment
10L Alternative embodiment
10M Alternative embodiment
12 License plate frame integrated with projection 13F Front face of frame
13R Rear face of frame
14 Side bars of frame
16A Upper cross bar of frame
16B Lower cross bar of frame
18 Attachment hole tabs
20 Attachment holes
22 Portion of face of frame situated on lower cross bar
23 Projections
23L Lower surface of projection
23U Upper surface of projection
24 Double-armed bracket
25 Upper arm of bracket
25L Lower surface
25U Upper surface
26 Lower arm of bracket
27 Receiving surface of projection
28 Width of bracket
30 Depth of bracket
32 Height of bracket
34 Thickness of bracket
36 Front face of upper arm of bracket
38 Bracket used with embodiment 10C
39 Bracket used with embodiment 10C
39A Arm of bracket that fits over parallel portion 23C
39B Arm of bracket that fits over parallel portion 23C
40 Knobs
42 Screws
44 Adhesive
46 Drill jig
48 Handle
49 Upper insert portion
50 Clear plastic window
51 Illumination compartment
52 Clear plastic window
53 Message strip
54 Light bulb
56 Screw holes
58 Screws
A Automobile
CF Conventional license plate frame
DL Deck lid
FT User's fingertips

What is claimed is:

1. An apparatus for operating a deck lid (DL) of an automobile (A) comprising:
    a license plate frame (12); said license plate frame (12) being mounted on said automobile (A);
    a projection (23); said projection (23) being rigidly coupled to said license plate frame (12);
    said projection (23) including
    an upper surface (27U) and a lower surface (27L);
    said upper and lower surfaces (27U) and (27L) each having a receiving surface (27) for safe contact with a user's fingertips (FT); and
    said projection (23) being rigidly and integrally formed on said license plate frame (12) to enable the operation of said deck lid (DL).

2. An apparatus as claimed in claim 1, further comprising:
    an illumination compartment (51); said illumination compartment (51) being integrally formed within said fortified, rigid projection (23) and on said frame (12); said illumination compartment (51) including a light device (54);
    a clear window (52); said clear window (52) being mounted over said illumination compartment (51);
    a light transmissive message strip (53); said light transmissive strip (53) being mounted over said clear window (52).

3. The apparatus as recited in claim 1, in which said license plate frame (12) and said projection (23) are both fabricated from injection molded plastic.

4. The apparatus as recited in claim 1, in which said license plate frame (12) and said projection (23) are both fabricated from stamped metal.

5. The apparatus as recited in claim 1, in which said license plate frame (12) and said projection (23) are both fabricated from formed metal.

6. The apparatus as recited in claim 1, in which said license plate frame (12) and said projection (23) are both fabricated from machined aluminum.

7. The apparatus as recited in claim 1, in which said license plate frame (12) and said projection (23) are both fabricated from a diecast alloy.

8. The apparatus as recited in claim 1, in which said license plate frame (12) and said projection (23) are both fabricated from stainless steel.

9. The apparatus as recited in claim 1, in which said license plate frame (12) and said projection (23) are both fabricated from plastic.

10. An apparatus for operating a deck lid (DL) of an automobile having a license plate (LP) attached to said deck lid (DL) and having a connector hole formed in said deck lid (DL) using a connector to fasten said license plate to said deck lid (DL) using said connector hole comprising:
    a frame (12) including
        an upper cross bar (16A), a lower cross bar (16B) and two side bars (14) all integrally joined together; and
        a fortified, rigid projection (23) having an upper surface (27U) and a lower surface (27L); said fortified, rigid projection (23) being attached to said lower cross bar (16B);
    said frame (12) also having an attachment hole (20);
    said upper surface (27U) and a lower surface (27L) of said fortified, rigid projection (23) for receiving a user's fingertips (FT);
    said frame (12) being coupled to said deck lid (DL) and to said license plate using said connector and said connector hole after the manufacture of said automobile is complete; and
    said automotive deck lid (DL) being caused to open by application of pressure of said user's fingertips (FT) upward upon said lower surface (27U) of said fortified, rigid projection (23).

11. A method for opening an automotive deck lid (DL) comprising the steps of:
    supplying a frame (12) having a fortified, rigid projection (23) integrally formed with said frame (12); said projection (23) having a contact portion (25) and an attachment hole (20); said contact portion (25) having an upper surface (25U) and a lower surface (25L) upon which a user's fingertips (FT) are placed;
    coupling said frame (12) to said automotive deck lid (DL) through said attachment hole (20) after said automotive deck lid (DL) is manufactured; and
    opening said automotive deck lid (DL) by applying pressure of said user's fingertips (FT) upward upon said lower surface (25L) of said contact portion (25).

12. A method for closing an automotive deck lid (DL) comprising the steps of:

supplying a frame (12) having a fortified, rigid projection (23) integrally formed with said frame (12); said projection (23) having a contact portion (25) and an attachment hole (20); said contact portion (25) having an upper surface (25U) and a lower surface (25L) upon which a user's fingertips (FT) are placed;

coupling said frame (12) to said automotive deck lid (DL) through said attachment hole (20) after said automotive deck lid (DL) is manufactured; and closing said automotive deck lid (DL) by applying pressure of said user's fingertips (FT) downward upon said upper surface (25U) of said contact portion (25).

* * * * *